(12) United States Patent
Arbuckle et al.

(10) Patent No.: US 8,454,402 B1
(45) Date of Patent: Jun. 4, 2013

(54) SYSTEMS AND METHODS FOR PERFORMING A SHIFT IN A TRANSMISSION IN MARINE PROPULSION SYSTEMS

(75) Inventors: Jason S. Arbuckle, Horicon, WI (US); Aaron J. Ward, Oshkosh, WI (US); Matthew W. Snyder, Fond du Lac, WI (US)

(73) Assignee: Brunswick Corporation, Lake Forest, IL (US)

( * ) Notice: Subject to any disclaimer, the term of this patent is extended or adjusted under 35 U.S.C. 154(b) by 213 days.

(21) Appl. No.: 13/046,085

(22) Filed: Mar. 11, 2011

(51) Int. Cl.
*B60W 10/04* (2006.01)
*B63H 21/21* (2006.01)

(52) U.S. Cl.
USPC .......................................................... 440/86

(58) Field of Classification Search
USPC ........................................ 440/75, 84, 86, 87
See application file for complete search history.

(56) References Cited

U.S. PATENT DOCUMENTS

| | | | |
|---|---|---|---|
| 3,703,642 A | 11/1972 | Balaguer | |
| 4,244,454 A | 1/1981 | Bankstahl | |
| 4,338,525 A | 7/1982 | Kilgore | |
| 6,273,771 B1 | 8/2001 | Buckley et al. | |
| 6,396,161 B1 | 5/2002 | Crecelius et al. | |
| 6,834,751 B1 | 12/2004 | Magee | |
| 6,942,530 B1 | 9/2005 | Hall et al. | |
| 6,960,107 B1 | 11/2005 | Schaub et al. | |
| 6,978,617 B2 | 12/2005 | Goldmeer et al. | |
| 2004/0090195 A1* | 5/2004 | Motsenbocker | 318/109 |

* cited by examiner

*Primary Examiner* — Daniel Venne
(74) *Attorney, Agent, or Firm* — Andrus, Sceales, Starke & Sawall, LLP

(57) ABSTRACT

Propulsion systems for marine vessels comprise an internal combustion engine rotating a driveshaft; an electric motor; a transmission selectively connecting the rotating driveshaft to a propulsor via a rotating gear; and a control circuit controlling the electric motor to slow rotation of the driveshaft and gear when a shift into the gear is requested.

20 Claims, 7 Drawing Sheets

SYSTEMS AND METHODS FOR PERFORMING A SHIFT IN A TRANSMISSION IN MARINE PROPULSION SYSTEMS

FIELD

The present disclosure relates to marine vessels, and particularly to propulsion systems and methods for marine vessels.

BACKGROUND

Typical marine vessels have one or more internal combustion engines that connect to a propeller via a driveshaft/transmission combination. The internal combustion engines and propellers provide all of the thrust required by the vessel. Some marine vessels also include one or more electric motors, which are typically small battery-powered motors utilized for trolling.

Abandoned U.S. patent application Ser. No. 11/505,075, expressly incorporated herein in entirety by reference, discloses hybrid marine propulsion systems that connect both an internal combustion engine and an electric motor to a propeller in torque-transmitting relation so that the propeller can selectively receive a sum of the torque provided by the engine and the motor. The engine and the electric motor are connectable in combined torque transmitting relation with each other and the propulsor is simultaneously connectable in torque transmitting relation with both the electric motor and the engine, in this way, the propulsor can be the recipient of the sum of the torque provided by the engine and the electric motor. The electric motor can be used as a sole source of torque for the propulsor or, alternatively, can be used in combination with the engine to drive the propulsor with the sum of the torque provided by the electric motor and the engine. The electric motor can be operable as a generator and can therefore be used to charge the electrical storage batter when it is connected in torque transmitting relation with the engine and is driven by the engine for its use as a generator. The engine and the electric motor are selectively connectable to a drive shaft which is, in turn, connected in torque transmitting relation with a transmission. The engine is controlled by a manual throttle and the controller operates the motor generator as an electric motor to provide additional torque to the shaft in order to drive the propulsor with the sum of the torque provided simultaneously by both the engine and the electric motor. When not used as a power boosting arrangement, the motor generator can be used as a generator to recharge the batteries as the marine vessel is operated under the sole power provided by the engine.

U.S. Pat. Nos. 4,244,454; 6,834,751; 6,960,107, expressly incorporated herein in entirety by reference, disclose transmissions for marine propulsion systems that use a cone clutch.

U.S. Pat. No. 6,942,530, expressly incorporated herein in entirety by reference, discloses a control system that controls the shifting process from neutral into either forward or reverse gear so that the impact of the shift event is minimized and the likelihood of engine stalling is decreased.

U.S. patent application Ser. No. 12/946,619, expressly incorporated herein in entirety by reference, discloses a marine drive having a gear case housing a vertical driveshaft that rotates a generally horizontal propulsor shaft.

U.S. Pat. No. 3,703,642, which issued to Balaguer on Nov. 21, 1972, describes an outboard motor unit for use on small boats. It has a primary propulsion engine connected through a clutch to the propeller shaft and an electric motor aligned with and connected to the propeller shaft. The electric motor is connected to a battery through a switch operatively connected to the engine throttle to complete the power connection for the electric motor when the throttle is at a selected proportion of full throttle. The electric motor operates as a motor when the engine is stopped and as a generator when the engine is running.

U.S. Pat. No. 4,338,525, which issued to Kilgore on Jul. 6, 1982, describes a marine propulsion system. A marine propulsion system is described that includes a gas turbine, an alternating current generator, a fixed pitch propeller, a synchronous motor and a frequency converter. The frequency converter is connected electrically between the generator and motor during starting, and reversal procedures when the motor would normally have to operate as an induction motor. Means are provided to brake the system dynamically to speeds within the capacity of the frequency converter. At speeds within the frequency converter's design capacity, the motor can be operated synchronously while it is running at a speed below the minimum operating, speed of the turbine and generator.

U.S. Pat. No. 6,396,161, which issued to Crecelius et al, on May 28, 2002, describes an integrated starter alternator troller. The device includes a stator portion and a rotor portion connected to a driveshaft. The system is incorporated into an engine assembly power train which includes an internal combustion engine having a crankshaft connected to an electric clutch. The electric clutch is operable to connect or disconnect the driveshaft and the crankshaft. Thus the system may be connected to or disconnected from the crankshaft of the internal, combustion engine. When connected to the engine by the clutch, the device is operable to receive electrical power from a battery and act as a cranking motor to provide starting torque to the internal combustion engine. The device may also be driven by the internal combustion engine and act as a generator to provide power to recharge the battery or drive other electrical devices. When disconnected from the engine by the electric, clutch, the device receives electrical power from the battery and acts as a trolling motor to drive a propeller. The transmission is connected between the device and the propeller such that rotation of the device spins the propeller at a number of forward and reverse speeds.

U.S. patent application Ser. No. 10/492,796, which was filed by Anderson et al. on Dec. 5, 2001, describes a hybrid ship propulsion system. The system includes a main diesel engine for driving the marine turbine, and an electric motor. The electric motor has a nominal output that constitutes at least 20% of the nominal output of the main diesel engine. The electric motor remains continuously switched on and maintains, together with a variable pitch propeller, the main diesel engine at a favorable operating point. The combination of the main diesel engine and the electric motor also allows for a more economical design or operation of the propulsion system.

U.S. Pat. No. 6,978,617, which issued to Goldnieer et al. on Dec. 27, 2005, describes a power generation system using a combustion system and a fuel cell. The fuel cell is combined with a combustion engine to create a closed loop power generation system. Stored hydrogen and oxygen are used by the regenerative fuel cell and by the combustion engine in which the reaction of the hydrogen and oxygen produces water in the gas phase.

U.S. patent application Ser. No. 11/188,144, which was filed by Kitani et al, on Jul. 22, 2005, describes an outboard motor that is equipped with a centrifugal clutch located between the crankshaft of an engine and a rotor of an electric motor. When the engine operates, it transmits its output through the rotor to a propeller. When the engine does not operate, it transmits the output of the motor to the crankshaft. The engine can therefore be started by the motor used to drive the propeller. As a result, there is no need to install a separate electric motor for engine starting, so that starting of the engine by electric power can be made possible with minimum increase in the size and cost of the outboard motor.

SUMMARY

The present disclosure results from the present inventors' research and development of propulsion systems and methods for marine vessels, including propulsion systems having a gear case containing a driveshaft that rotates a propulsor shaft. The disclosure relates to the inventors' efforts to provide systems and methods that improve shifting processes from neutral into either forward or reverse gear so that the impact and noise of the shift event is minimized. The disclosure further relates to the inventors' efforts to provide systems and methods that improve shifting processes from forward to reverse gear or vice versa to quickly and efficiently slow and stop movement of a marine vessel and at the same time protect the propulsion system from damage.

In one example, a propulsion system for a marine vessel comprises an internal combustion engine rotating a driveshaft; an electric motor; a transmission selectively connecting the driveshaft to a propulsor via a rotating gear; and a control circuit controlling the electric motor to slow rotation of the driveshaft and gear when a shift into the gear is requested.

In a further example, the propulsion system comprises a clutch selectively connecting and disconnecting the internal combustion engine and driveshaft, wherein the control circuit controls the clutch to disconnect the internal combustion engine from the driveshaft when the shift is requested. Optionally, the control circuit can also control the clutch to connect the internal combustion engine to the driveshaft after the shift is completed.

Optionally the control circuit can control the electric motor to speed up rotation of the driveshaft after the shift is completed and before the internal combustion engine is connected to the driveshaft. Further optionally, the control circuit can control the electric motor to substantially synchronize speed of rotation of the driveshaft and speed of the internal combustion engine after the shift is completed and before the internal combustion engine is connected to the driveshaft.

In another example, a method of operating a propulsion system for a marine vessel comprises: operating an internal combustion engine to rotate a driveshaft and a gear; sensing with a sensor a request for a shift into the gear; communicating the sensed request to a control circuit; and controlling with a control circuit an electric motor to slow rotation of the driveshaft and gear, and optionally further comprises controlling the transmission to complete the shift.

In another example, the method comprises monitoring rotational speed of the gear and comparing the monitored rotational speed to a threshold, wherein the electric motor is controlled to slow down rotation of the driveshaft based on how the monitored rotational speed compares to the threshold.

Further optionally the method comprises controlling the transmission to connect the internal combustion engine to the driveshaft after the shift is completed. Further optionally, the control circuit operates the electric motor to speed up rotation of the driveshaft after the shift is completed and before the internal combustion engine is connected to the driveshaft. Further optionally, the electric motor is controlled to synchronize the rotational speed of the gear with speed of the internal combustion engine before controlling the transmission to connect the internal combustion engine to the driveshaft.

DETAILED DESCRIPTION OF THE DRAWINGS

In the present description, certain terms have been used for brevity, clearness and understanding. No unnecessary limitations are to be implied therefrom beyond the requirement of the prior art because such terms are used for descriptive purposes only and are intended to be broadly construed. The different systems and methods described herein may be used alone or in combination with other systems and methods. Various equivalents, alternatives and modifications are possible within the scope of the appended claims. Each limitation in the appended claims is intended to invoke interpretation under 35 U.S.C. §112, sixth paragraph only if the terms "means for" or "step for" are explicitly recited in the respective limitation.

Figure 1:
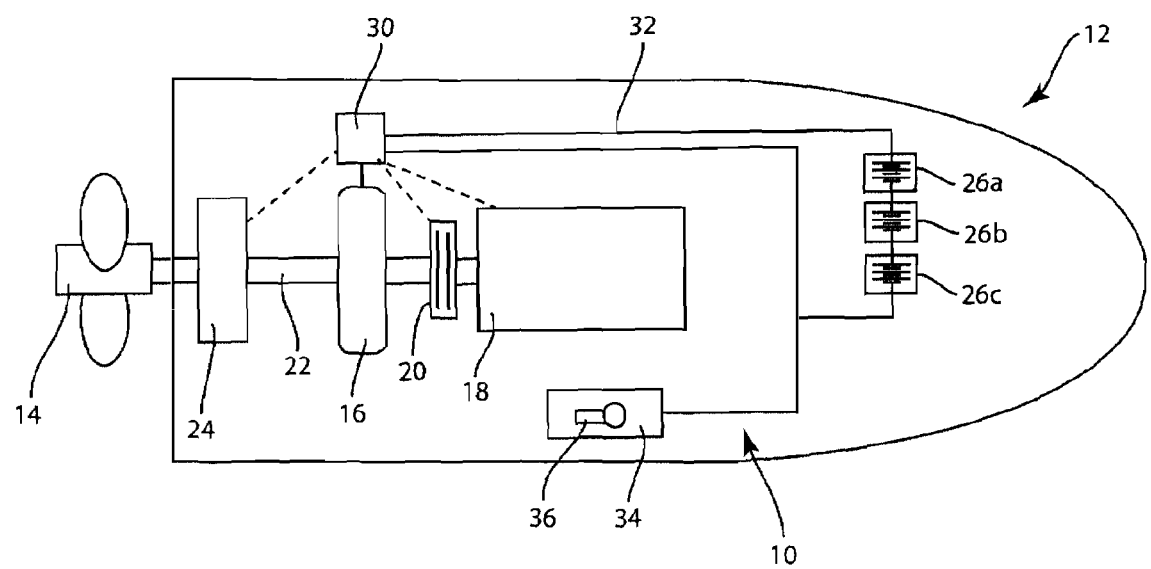
FIG. 1 is a schematic view of an exemplary marine vessel and propulsion system.

FIG. 1 depicts a marine propulsion system 10 for a marine vessel 12. The system 10 includes among other things one or more propulsors 14 (collectively referred to hereinafter as "propulsor"), which can include any type of device for propelling the marine vessel 12 including but not limited to one or more propellers (as shown in FIG. 1), impellors, stern drives, pod drives, and/or the like. The propulsor 14 is selectively driven by one or more electric motors 16 (collectively referred to hereinafter as "motor"), one or more internal combustion engines 18 (collectively referred to hereinafter as "engine"), or a combination of the motor 16 and engine 18. In the example shown, the system 10 also includes one or more clutches 20 (collectively referred to hereinafter as "clutch") for selectively connecting and disconnecting the engine 18 from a driveshaft 22 that extends from the engine 18 to a transmission 24 for driving the propulsor 14. The engine 18 can include a diesel engine or any other type of engine for providing power to the propulsor 14. The clutch 20 can include any type of clutch for connecting and disconnecting the engine 18 and driveshaft 22, such as for example a friction clutch or a dog clutch allowing for synchronization of the speeds of the motor 16 and engine 18 (i.e., substantially matched) before the clutch 20 is engaged or disengaged.

The motor is located between the clutch 20 and transmission 24 and may be configured to drive driveshaft 22 at the same time or separately from the engine 18. In the example shown, the driveshaft 22 extends through and forms a part of the motor 16; however, arrangements where the motor 16 and driveshaft 22 are oriented differently, connected by intermediate components, and/or are separate components are also contemplated by this disclosure. Together, the engine 18, clutch 20, motor 16 and transmission 24 provide forward, neutral, and reverse operations of propulsor 14 in a "parallel" drive arrangement; however it should be recognized that the examples shown and described are not limiting and that the concepts discussed and claimed herein are applicable to other types of parallel and non-parallel hybrid marine propulsion configurations and/or other types of non-hybrid marine propulsion configurations.

The system 10 further includes a plurality of rechargeable storage batteries 26a, 26b, 26c, which are connected in electrical communication with the motor 16 and discharge current to power the motor 16. In FIG. 1, three batteries 26a, 26b, 26c are shown connected in series with each other and to system 10; however, the number of batteries 26a, 26b, 26c and the configuration thereof can be easily modified and such modifications are contemplated by this disclosure. In another example, an alternate load source can be employed instead of batteries, such as for example capacitors, house load, another electric motor, and/or the like.

In one example, the electric motor 16 is operable as a generator to recharge the batteries 26a, 26b, 26c. In this arrangement, the motor/generator 16 is connectable in torque-transmitting relation with, and driven by, the engine 18, which in turn provides a supply of current for recharging batteries 26a, 26b, 26c. It is not required that the electric motor operate as both a motor and generator.

Figure 2:
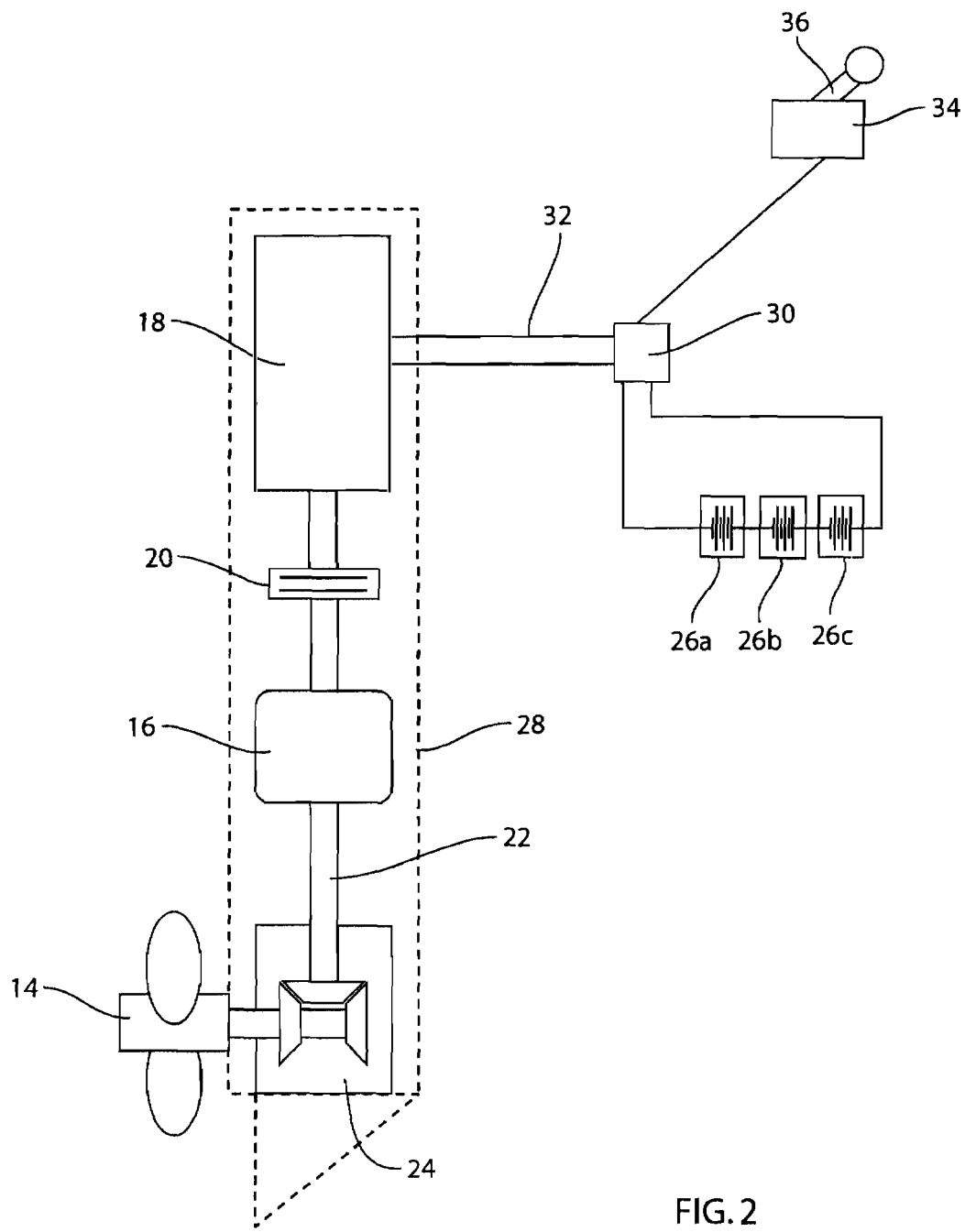
FIG. 2 is a schematic view of another exemplary marine vessel and propulsion system.

FIG. 1 depicts a stern drive marine arrangement; however the concepts disclosed in this application are applicable to any type of marine propulsion system, such as for example an outboard motor arrangement. FIG. 2 depicts an outboard motor 28 according to such an arrangement, having reference numbers corresponding to the structures described herein above with reference to FIG. 1.

The system 10 also includes a control circuit 30 connected to a controller area network (CAN) 32 for operating the system 10 in a plurality of operational modes. The control circuit 30 is shown schematically and can include a plurality of controller sections (not shown), each section having a memory and programmable processor for processing computer code, for sending and receiving electronic control signals, for communicating with other control circuits in the CAN 32, and for controlling operations of certain components in the system 10, such as motor 16, engine 18, clutch 20 and transmission 24. The programming and operations of the control circuit 30 (and optional control sections thereof) are described further in detail below with respect to non-limiting examples and/or algorithms. While each of these examples/algorithms includes a specific series of steps for accomplishing certain system control functions, the scope of this disclosure is not intended to be bound by the literal order or literal content of steps described herein, and all non-substantial differences or changes still fall within the scope of the disclosure. Also, the configuration of the control circuit 30, CAN 32 (and optional control sections thereof) can vary significantly. For example, the control circuit 30 does not need to include separately located sections and can instead comprise a single control device located at one location. Conversely, the control circuit 30 can include multiple sections located at different locations on or remote from the marine vessel 12.

In the example shown, the control circuit 30 is configured to receive user inputs via the CAN 32 from a user input device 34. The user input device 34 is shown schematically in FIGS. 1 and 2 as a conventional combination throttle/shift lever 36; however, the user input device 34 is not limited to this configuration and could additionally or alternatively comprise other devices for inputting commands to the system 10, such as input keys, joysticks, touch screens, and/or the like, and any other structure or device that could be substituted by one having ordinary skill in the art to input user commands into a control system. In the example shown, actuation of the user input device 34 is sensed by sensors (not shown) and communicated to the control circuit 30 via the CAN 32.

The control circuit 30 is programmed to convert the signals communicated by the user input device 34 into electronic commands and then send the commands to control functionality of, for example, the motor 16, engine 18, clutch 20, and/or the transmission 24. Control by the control circuit 30 can be facilitated by the CAN 32 and/or related control sections, as discussed above. For example, the system 10 can include a transmission engine controller (not shown) that controls engine/transmission/shifting and reads signals regarding transmission state and output speed, a thermal, clutch motor interface module (not shown) that controls the clutch 20 and provides communication interface between the CAN 32 and a related control section for motor 16. Various sections of control circuit 30 can therefore remain aware of and control operational characteristics and status of related devices in the system 10, such as the speed of engine 18, speed of motor 16 and speed of driveshaft 22. Again, the exact type of control circuit 30 and communication network, such as CAN 32 can vary significantly and still fall within the scope of the present disclosure and achieve the functional activities discussed herein.

As discussed in the above referenced, incorporated U.S. patent application Ser. No. 12/946,619, the control circuit 30 can be programmed to switch amongst different modes of control to provide a hybrid control arrangement. These modes can include, for example, (1) an engine mode wherein the engine 18 is connected to the propulsor 14 by the clutch 20 and all of the driving force to the propulsor 14 is provided by the engine 18; (2) an electric mode, wherein the motor 16 is connected to the propulsor 14 and all of the driving force to the propulsor 14 is provided by the motor 16; and (3) a combined mode wherein both the engine 18 and the motor 16 are connected to the propulsor 14 and the driving force to the propulsor 14 is provided by a combination of the engine 18 and the motor 16. Additional operational modes and features thereof are discussed in the incorporated U.S. patent application Ser. No. 11/505,075.

Figure 3:
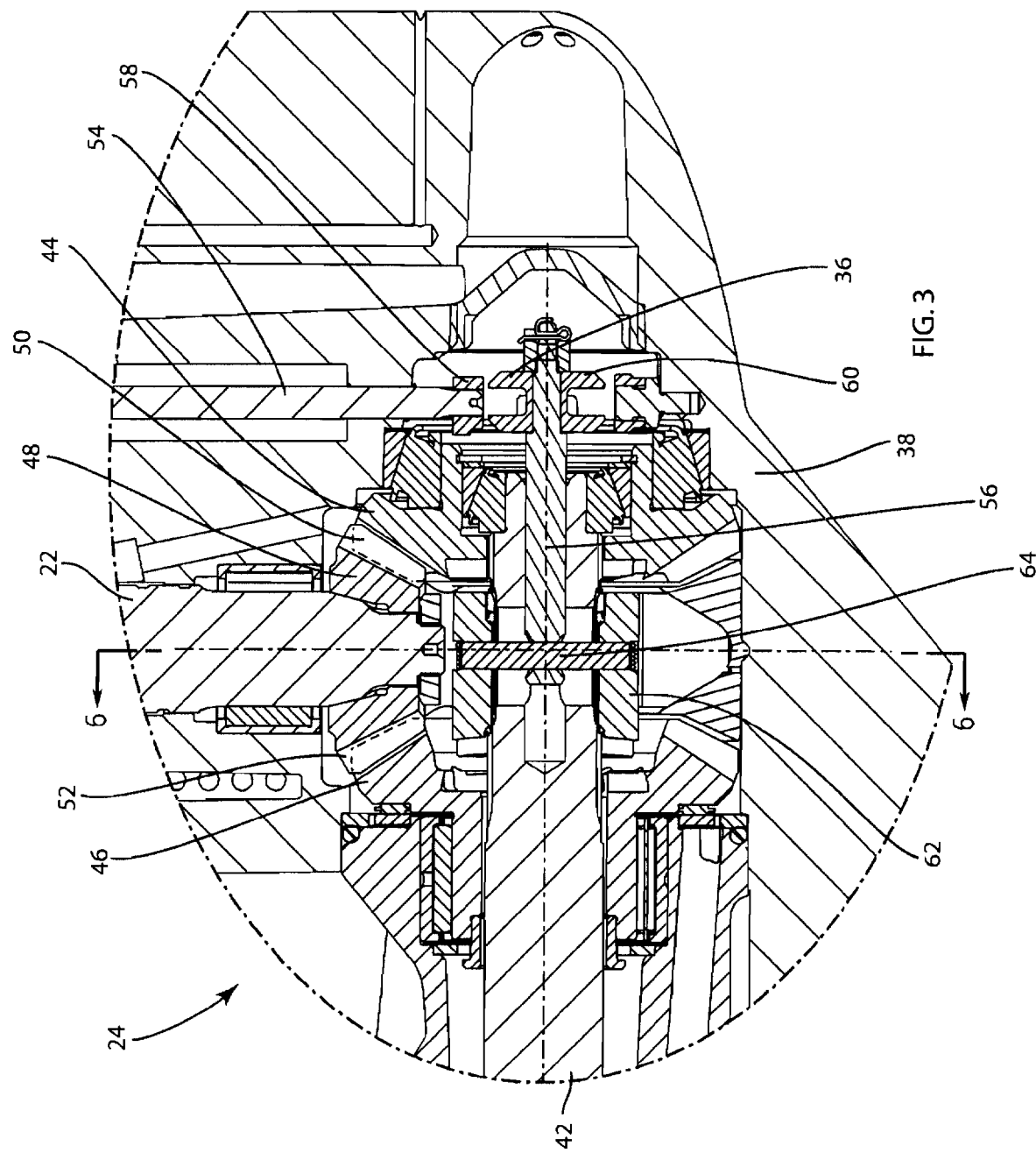
FIG. 3 is a sectional view of a gear case housing an exemplary transmission.

FIG. 3 shows an exemplary transmission 24 contained within a gearcase 38. The particular transmission 24 depicted in FIG. 3 is configured for an outboard motor arrangement, such as is shown in FIG. 2. However, the concepts described and claimed in the present disclosure are applicable to transmission arrangements for other types of marine propulsion systems, including for example inboard arrangements and stern drives. For example, the concepts disclosed herein are applicable to cone clutch arrangements, which are typically utilized in stern drives such as the stern drive arrangement shown in FIG. 1. Examples of cone clutch arrangements for stern drives are disclosed in the incorporated U.S. Pat. Nos. 4,244,454; 6,834,751; and 6,960,107. The clutch arrangement and related gears shown in FIG. 3 are shown for exemplary purposes only and are not limiting on the concepts of this disclosure.

As shown in FIG. 3, the gearcase 38 houses the driveshaft 22, which extends into the gearcase 38 and rotates a generally horizontal propulsor shaft 42 in a forward direction upon operational engagement with a forwardly rotatable gear 44 and a reverse direction upon operational engagement with a reversely rotatable gear 46. The propulsor shaft 42 is connected to the propulsor 14, which in the example shown is a propeller (see FIG. 2). Rotation of the propulsor shaft 42 in a forward direction causes forward rotation of the propulsor 14, whereas rotation of the propulsor shaft 42 in a reverse direction causes reverse rotation of the propulsor 14.

The driveshaft 22 is driven by the engine 18, motor 16, or a combination thereof according to the operational modes discussed above. A pinion 48 disposed on the lower end of the driveshaft 22 spins with the driveshaft 22 and continuously drives the forwardly rotatable gear 44 into forward rotation and the reversely rotatable gear 46 into reverse rotation. The pinion 48 remains connected to the forwardly rotatable gear 44 via meshed gear teeth 50 and to the reversely rotatable gear 46 by meshed gear teeth 52. A shift shaft 54 extends into the gearcase 38 and is connected to a shift spool shaft 56 via a shift crank 58 and shift spool 60. A clutch 62 is connected to the shift spool shaft 56 via cross pin 64. Rotation of the shift shaft 54 in one direction moves the clutch 62 so as to engage the forwardly rotatable gear 44. Rotation of the shift shaft 54 in the opposite direction moves the clutch 62 so as to engage the rearwardly rotatable gear 46. The clutch 62 is connected to the propulsor shaft 42 such that engaging the forwardly rotatable gear 44 forwardly rotates the propulsor shaft 42 and engaging the reversely rotatable gear 46 reversely rotates the propulsor shaft 42. FIG. 2 depicts the clutch 62 in a neutral position wherein both the forwardly rotatable gear 44 and reversely rotatable gear 46 are rotating and the propulsor shaft 42 is stationary.

Further description of the gearcase 38 and respective transmission 24 is provided in the incorporated U.S. patent application Ser. No. 12/946,619. As discussed above, the gearcase 38 and respective transmission 24 are shown in FIG. 3 for exemplary purposes only and are not limiting on the concepts of this disclosure.

Transmission and clutch arrangements for marine propulsion systems such as the dog clutch arrangement shown in FIG. 3 and the cone clutch arrangements disclosed in the incorporated U.S. Pat. Nos. 4,244,454; 6,834,751; and 6,960,107; have the drawback of encountering significant impact noise and impact shock when shifting from neutral into either the forwardly rotatable gear (e.g. 44) or the reversely rotatable gear (e.g. 46). Prior art systems and methods have attempted to minimize these drawbacks by controlling various characteristics of the engine (e.g., 18) immediately prior to and during the shifting event. For example, the incorporated U.S. Pat. No. 6,942,530 alters ignition timing and the status of an idle air control valve to achieve a desired engine idle speed during the shift event, thereby reducing impact shock and resulting noise of the shift event without causing the engine to stall. The present inventors have recognized that altering operational characteristics of the engine during the shift event is not always the most effective way to reduce shock and noise. For example, internal combustion engines have minimum speed set points that cannot be surpassed due to engine noise vibration and harshness requirements and combustion quality requirements. The inventors have also recognized that marine propulsion systems that comprise an electric motor (e.g., motor 16) provide an opportunity to control speed of the rotating driveshaft (e.g., 22) prior to, during and/or after the shifting event to minimize the noted shock and noise.

The above noted transmission and clutch arrangements for marine propulsion systems also have drawbacks encountered when the marine vessel has forward momentum and the operator needs to stop the vessel quickly. When the vessel is in forward gear and it is necessary to stop the vessel quickly, for example to avoid a collision, the natural reaction for the operator is to quickly move the control lever (e.g. 36) from the forward gear into the reverse gear. Current transmission and clutch arrangements are typically not suited to handle the large shock loads caused by a change in gear at high gearcase speeds. To avoid damage to the transmission, many current systems automatically prevent the requested shift from occurring until engine speed drops below a calibrated threshold. The inventors have recognized that there are problems with these current systems. For example, when the operator requests a shift from forward gear to reverse gear, the marine vessel will coast in neutral gear until the above mentioned speed criteria are met. Considerable distance can be covered by the marine vessel during this time which can cause overshoot and fail to meet the requested stopping maneuver. The inventors have recognized that marine propulsion systems that comprise an electric motor (e.g., motor 16) provide an opportunity to control speed of the rotating driveshaft (e.g. 22) prior to, during and/or after the shifting event to more quickly achieve a requested stopping maneuver.

In the examples shown in FIGS. 1-3, the inventors have configured the control circuit 30 to control the electric motor 16 to slow rotation of the driveshaft 22 and related forwardly rotating and/or reversely rotating gears 44, 46 when a shift into the respective gear is requested via for example the user input device 34. With this arrangement, it is possible to minimize the above mentioned drawbacks. For example, when a shift from neutral into either of the forwardly rotating or reversely rotating gears 44, 46 is requested by a user via the input device 34, operation of the electric motor 16 to slow rotation of the driveshaft 22 and related gear 44 or 46 facilitates an easier shift into said gear, thus minimizing noise and vibration. In another example, when a user requests a shift from for example the forwardly rotating gear 44 into the reversely rotating gear 46, slowing of the driveshaft 22 by the electric motor 16 allows the shift to be made more quickly to achieve a quicker stopping maneuver, while still protecting the engine 18, driveshaft 22 and transmission 24 from damage. In any of these examples, the motor 16 can be controlled by the control circuit 30 to generate electricity to charge at least one battery 26a, 26b, 26c as the motor 16 slows rotation of the driveshaft 22.

In one example, the control circuit 30 is configured to control the clutch 20 to selectively connect and disconnect the internal combustion engine 18 and driveshaft 22. In use, the control circuit 30 can control the clutch 20 to disconnect the engine 18 from the driveshaft 22 when a shift is requested via the user input device 34. Further, the control circuit 30 can control the clutch 20 to reconnect the engine 18 to the driveshaft 22 after the shift has been completed. In the example where a shift from neutral into either the forwardly rotating gear 44 or reversely rotating gear 46 is requested, the control circuit 30 can also operate the electric motor 16 to speed up rotation of the driveshaft 22 after the shift is completed and before the engine 18 is connected to the driveshaft 22. This advantageously facilitates smoother connection between the engine 18 and rotating driveshaft 22. In this example, optionally, the control circuit 30 can control the electric motor 16 to substantially synchronize the speed of rotation of the driveshaft 22 and the speed of the engine 18 after the shift is completed and before the engine 18 is connected to the driveshaft 22, thus optimizing a smooth connection. In the example where the user is requesting a shift from one rotating gear into another, for example from the forwardly rotating gear 44 into the reversely rotating gear 46, the control circuit 30 can control the motor 16 to slow down rotation of the driveshaft 22 to a preset idle speed. Once the idle speed set point is reached, the control circuit 30 can further reconnect the engine 18 and driveshaft 22.

Figure 4:
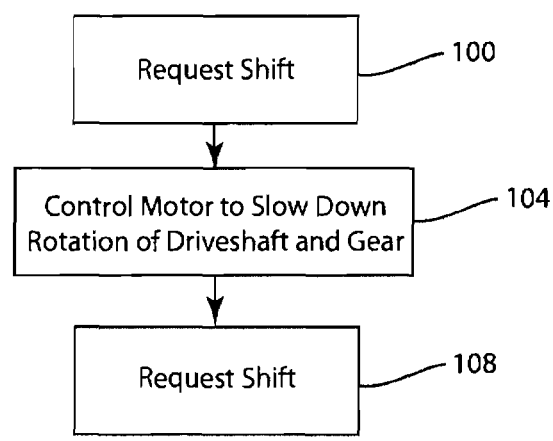
FIG. 4 is a flow chart illustrating steps in one example of a method of operating a propulsion system for a marine vessel.

FIG. 4 depicts one example of a method of operating the above-described propulsion systems (e.g. 10) for a marine vessel (e.g. 12). This example relates to situations when the user requests a shift from neutral into one of a forwardly rotating gear (e.g. 44) and reversely rotating gear (e.g. 46), as well as situations when the user requests a shift from one of the forwardly rotating gear and reversely rotating gear into the other of the forwardly rotating gear and reversely rotating gear. During operation of the marine vessel, an internal combustion engine, such as engine 18, operates to rotate a driveshaft, such as driveshaft 22. A sensor (not shown), on for example a user input device 34, senses a user requesting a shift into one of the forwardly rotating gear and reversely rotating gear according to the above-described situations. The user input device then sends a signal to communicate to a control circuit, such as control circuit 30, that the request for a shift has been made. The control circuit controls an electric motor, such as electric motor 16, to slow rotation of the driveshaft and the respective rotating gear. In general, at step 100, a request for a shift is made. At step 104, a motor is controlled to slow down rotation of a rotating driveshaft and related gear. At step 108, the shift is completed.

Figure 5:
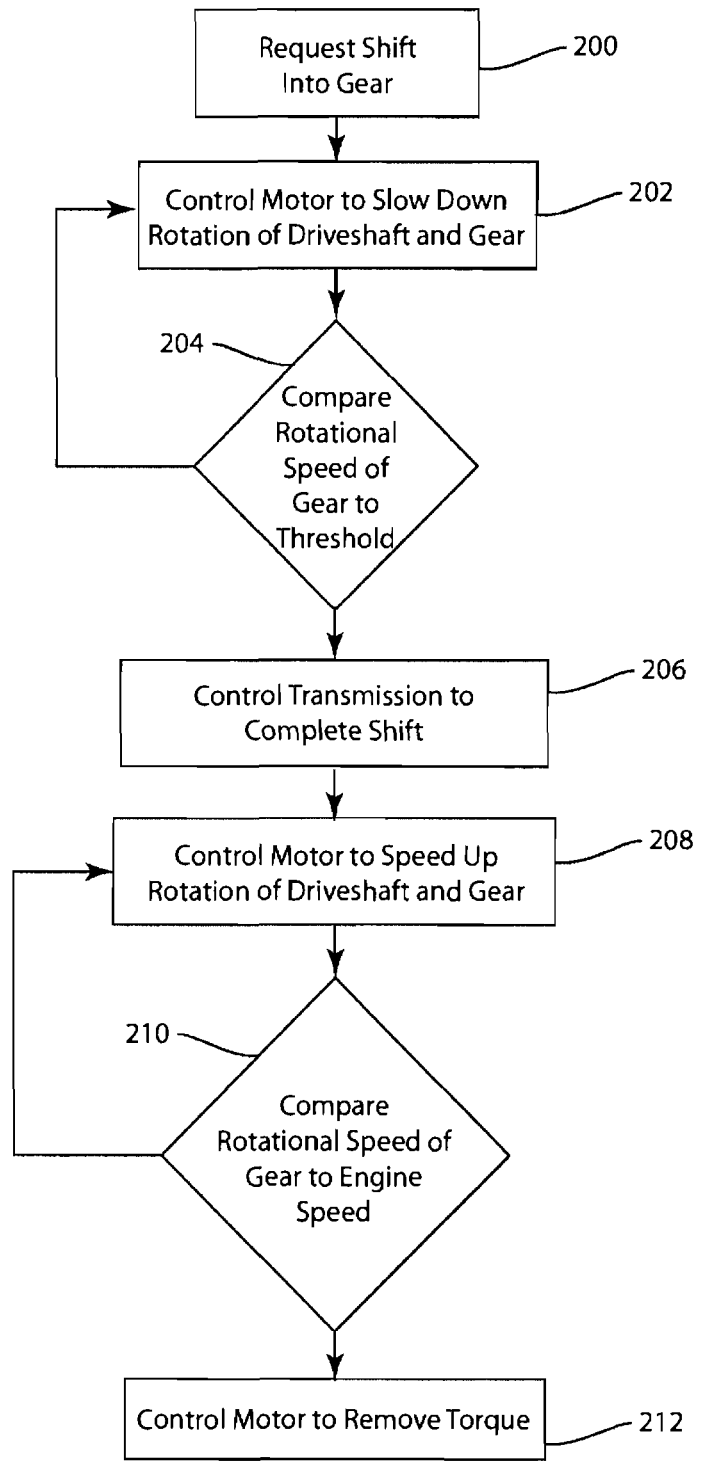
FIG. 5 is a flow chart illustrating another example of steps in a method of operating a propulsion system for a marine vessel.

FIG. 5 depicts another example of a method of operating a propulsion system (e.g. 10) for a marine vessel (e.g. 12). This example applies to both the situation when the user requests a shift from neutral into one of forwardly rotating and reversely rotating gears (e.g. 44, 46), and where the user requests a shift from one of the forwardly rotating gear and reversely rotating gear into the other of the forwardly rotating gear and reversely rotating gear. During operation of the marine vessel, an internal combustion engine, such as engine 18, operates to rotate a driveshaft, such as driveshaft 22. At step 200, a sensor (not shown) associated with a user input device (e.g. 34) senses a user requesting shift according to the above-described examples. At step 202, a control circuit (e.g. 30) controls a motor (e.g. 16) to slow down rotation of a driveshaft (e.g. 22) and corresponding gear. At step 204, the control circuit compares the rotational speed of the gear to a threshold. In the example where the user is requesting a shift from neutral into one of the forwardly and reversely rotating gears, the threshold can represent a minimum allowable gear speed selected to avoid noise and vibration during the shift event. In the example where the user is requesting a shift from one of the forwardly rotating gear and reversely rotating gear into the other of the forwardly rotating gear and reversely rotating gear, the threshold can represent an allowable gear speed that avoids damage to the system, including for example damage to the engine, driveshaft and/or transmission (e.g. 24). If this threshold has not been reached, step 202 is continued or repeated. Once the threshold is met, at step 206, the control circuit controls the transmission to complete the requested shift. Once the shift is completed, at step 208, the control circuit controls the motor to speed up rotation of the driveshaft and associated gear. At step 210, the control circuit is configured to compare the rotational speed of the driveshaft and/or gear to the speed of the engine. If the relative speed of the driveshaft and/or gear is not within a predetermined threshold amount of the speed of engine, step 208 can be repeated or continued. Once the relative speeds are within the threshold amount, at step 212, the control circuit can control the motor to remove torque from the driveshaft.

Figure 6:
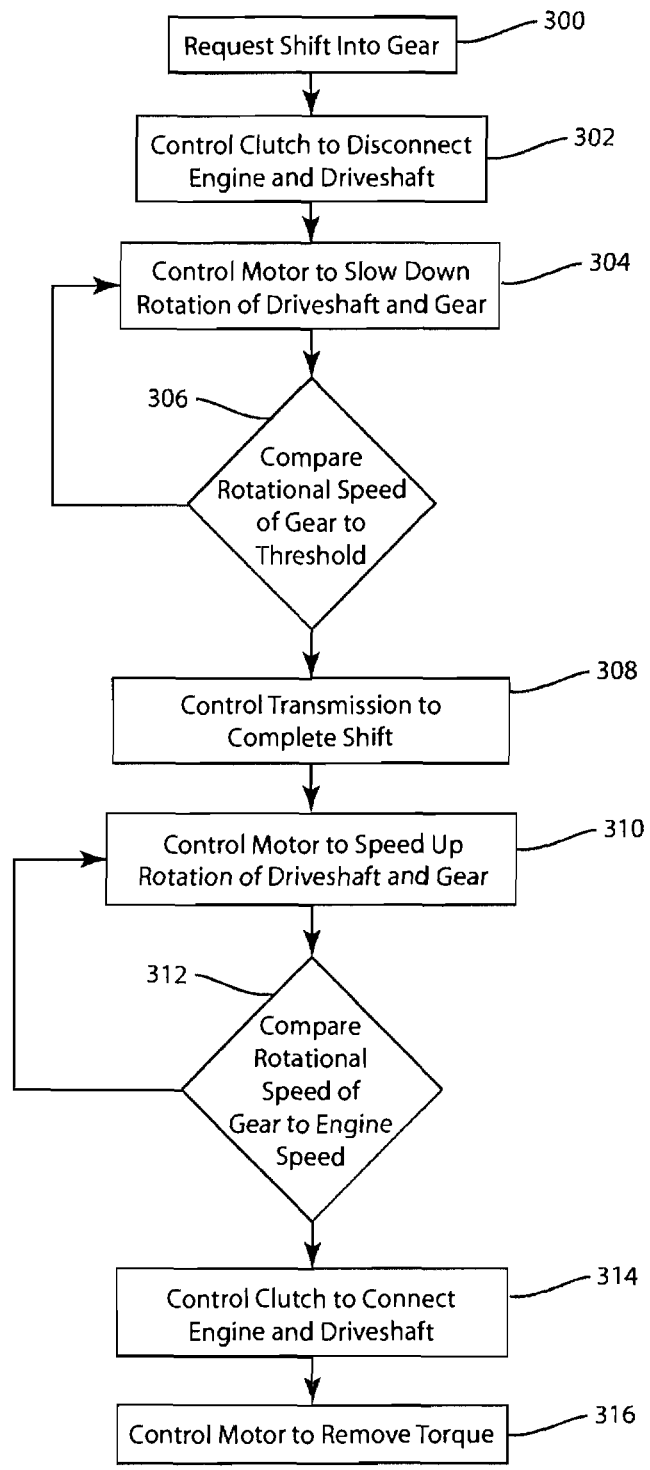
FIG. 6 is a flow chart illustrating another example of steps in a method of operating a propulsion system for a marine vessel.

FIG. 6 depicts another example of a method of operating a propulsion system for a marine vessel. The example shown in FIG. 6 is also applicable to both the situation where a user requests a shift from neutral into one of a forwardly rotating gear and a reversely rotating gear, as well as the situation where the user requests shift from one of the forwardly and rearwardly rotating gears into the other of the forwardly and rearwardly rotating gears. At step 300, a request for a change in transmission is made, for example via a user input device. At step 302, the control circuit controls the clutch (e.g. 20) to disconnect the engine and driveshaft. At step 304, the control circuit controls motor to slow down rotation of the driveshaft and related gear. At step 306, the control circuit compares the rotational speed of the driveshaft or gear to a threshold. As described with respect to FIG. 5, the threshold can be a minimum speed that is selected to minimize shift noise and vibration. Alternately, the threshold can be a minimum allowable speed selected to prevent damage to the system, and particularly for example to the engine, driveshaft or transmission. If the threshold is not met, step 304 can be repeated or continued. Once the threshold is met, at step 308, the control circuit controls the transmission to complete the shift that has been requested. At step 310, the control circuit controls the motor to speed up rotation of the driveshaft and/or respective gear. At step 312, the control circuit can compare the rotational speed of the driveshaft and/or gear to the current speed of engine. If the rotational speed of the driveshaft and/or gear is within a predetermined threshold amount of the speed of engine, at step 314, the control circuit controls the clutch to connect the engine and driveshaft. Conversely, if the rotational speed of the driveshaft and/or gear is not within a predetermined amount of the speed of engine, step 310 can be repeated or continued. At step 316, the control circuit controls the motor to remove torque from the driveshaft.

Figure 7:
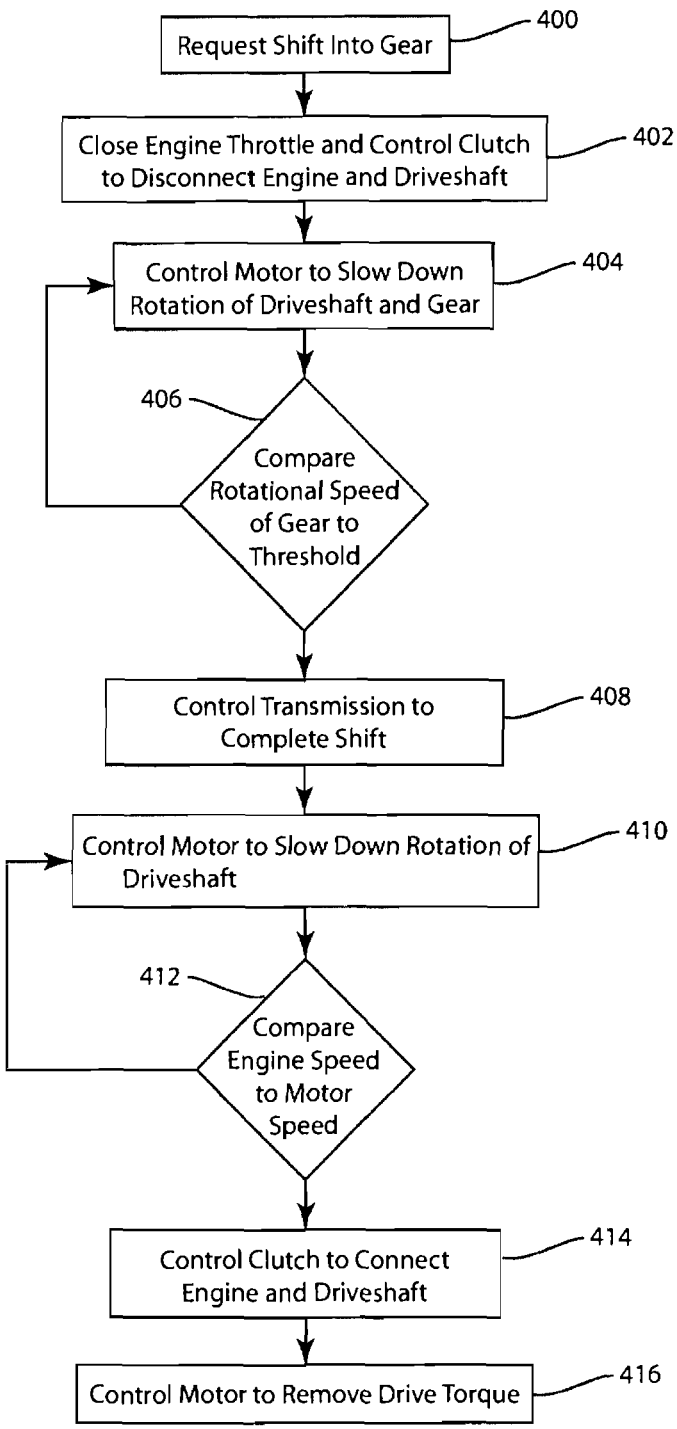
FIG. 7 is a flow chart illustrating another example of steps in a method of operating a propulsion system for a marine vessel.

FIG. 7 depicts another example of a method of operating a propulsion system for a marine vessel. The example shown in FIG. 7 is particularly applicable to the situation where a user requests shift from one of a forwardly and reversely rotating gears (e.g. 44, 46) into the other of the forwardly and reversely rotating gears. This method is particularly useful when the marine vessel is being operated in the forwardly rotating gear at a relatively high speed and the user desires to stop the marine vessel 10 as quickly as possible. At step 400, a request for a shift from one of a forwardly rotating gear and reversely rotating gear into the other of the forwardly rotating gear and reversely rotating gear is requested. At step 402, the control circuit controls the engine to close the engine's throttle and also controls a clutch to disconnect the engine and associated driveshaft. At step 404, the control circuit controls the motor to slow down rotation of the driveshaft and related forwardly rotating gear and reversely rotating gear. At step 406, the control circuit compares the rotational speed of the respective forwardly rotating gear or rearwardly rotating gear to a threshold. The threshold can be selected to be an allowable rotational speed of the driveshaft or gear that prevents damage to the engine, driveshaft and/or transmission during a shift event. If the threshold is not met, step 404 can be repeated or continued. Once the threshold is met, at step 408, the control circuit controls the transmission to complete the requested shift. At step 410, the control circuit continues to control the motor to slow down rotation of the driveshaft and gear to a threshold speed, such as a speed that is at or above an idle speed set point. At step 412, the control circuit compares the current speed of engine to the current speed of motor. If the respective speeds are not within a predetermined amount, step 410 can be continued or repeated. Once the respective speeds are within a predetermined amount of each other, at step 414, the control circuit controls the clutch to connect the engine and driveshaft. At step 416, the control circuit controls the motor to remove drive torque from the system.

It will thus be seen that the present disclosure provides a method of operating a propulsion system for a marine vessel wherein the rotational speed of a gear associated with the marine vessel is monitored and compared to a threshold, wherein the electric motor is controlled to slow down rotation of the driveshaft based on how the monitored rotational speed compares to the threshold. Further, the method can include the step of controlling the electric motor to speed up rotation of the driveshaft after the shift is completed. Further optionally, the method can include monitoring a rotational speed of the gear and comparing the monitored rotational speed to a threshold, wherein the electric motor is controlled to speed up rotation of the driveshaft based on how the monitored rotational speed compares to the threshold. Further optionally, the transmission can be controlled to connect the internal combustion engine to the driveshaft after the shift is completed. As discussed above, the electric motor can be controlled to synchronize the monitored rotational speed with speed of the internal combustion engine before controlling the transmission to connect the internal combustion engine to the driveshaft. In some examples, the electric motor can be operated to generate electricity to charge at least one battery as the electric motor slows rotation of the driveshaft.

What is claimed is:

1. A propulsion system for a marine vessel, the propulsion system comprising:
    a propulsor that is rotationally connected to a driveshaft by a transmission, the propulsor configured to propel the marine vessel upon rotation of the driveshaft;
    wherein the transmission comprises a rotating gear and effects a shift change by connecting or disconnecting the driveshaft and the propulsor via the rotating gear;
    an internal combustion engine that is rotationally connected in torque transmitting relation to the driveshaft by a clutch such that the internal combustion engine rotates the driveshaft;
    an electric motor that is rotationally connected in torque transmitting relation to the driveshaft such that the electric motor rotates the driveshaft;
    a control circuit that controls the speed of the electric motor to apply torque to and thereby control speed of rotation of the driveshaft; and
    an input device that inputs an operator request for the shift change to the control circuit;
    wherein the control circuit controls the speed of the electric Motor to thereby decrease the speed of rotation of the driveshaft when the operator request for the shift change is input to the control circuit by the input device.

2. The propulsion system according to claim 1, wherein the rotating gear comprises one of a forwardly rotating gear for forward propulsion and a reversely rotating, gear for reverse propulsion; and wherein the shift change comprises a connection of the driveshaft to the propulsor via the one of the forwardly rotating, gear and the reversely rotating gear.

3. The propulsion system according to claim 1, wherein the rotating gear comprises one of a reversely rotating gear for reverse propulsion and a forwardly rotating gear for forward propulsion and wherein the shift change comprises disconnection of the driveshaft from the propulsor via one of the reversely rotating gear and forwardly rotating gear and connection of the driveshaft to the propulsor via the other of the reversely rotating gears and forwardly rotating gears.

4. The propulsion system according to claim 1, wherein the control circuit controls the speed of the electric motor to thereby increase the speed of rotation of the driveshaft after the shift change.

5. A propulsion system according to claim 1, wherein the control circuit controls the clutch to rotationally disengage the internal combustion engine from the driveshaft before the shift change.

6. The propulsion system according, to claim 5, wherein the control circuit controls the clutch to rotationally engage the internal combustion engine and the driveshaft after the shift change.

7. The propulsion system according to claim 6, wherein the control circuit controls the speed of the electric motor to thereby increase the speed of rotation of the driveshaft after the shift change completed and before the internal combustion engine is rotationally engaged with to the driveshaft by the clutch.

8. The propulsion system according to claim 7, wherein the control circuit controls the speed of the electric motor to thereby substantially synchronize speed of rotation of the driveshaft and speed of the internal combustion engine after the shift chance and before the internal combustion engine is rotationally engaged with the driveshaft by the clutch.

9. The propulsion system according to claim 1, wherein the electric motor is rotationally engaged with the driveshaft between the internal combustion engine and the transmission.

10. The propulsion system according to claim 1, comprising at least one battery powering the electric motor, wherein the electric motor generates electricity to charge the at least one battery as the electric motor slows rotation of the driveshaft.

11. A method of operating a propulsion system for a marine vessel, the method comprising:
    providing an internal combustion engine that is rotationally connected in torque transmitting relation to a driveshaft by a clutch such that the internal combustion engine rotates the driveshaft and thereby powers a propulsor for propelling the marine vessel;
    wherein the transmission comprises a rotating gear and effects a shift change by connecting or disconnecting the driveshaft and the propulsor via the rotating gear; and
    providing an electric motor that is rotationally connected in torque transmitting relation to the driveshaft such that the electric motor rotates the driveshaft and thereby powers the propulsor for propelling the marine vessel; and
    receiving with a control circuit an operator request for the shift change and then slowing a speed of the electric motor to thereby decrease speed of rotation of the driveshaft before the shift change occurs.

12. The method according to claim 11, further comprising controlling with the control circuit the transmission to complete the shift change.

13. The method according to claim 12, wherein the rotating gear comprises one of a forwardly rotating gear for forward propulsion and a reversely rotating gear for reverse propulsion; and wherein the shift change comprises a connection of the driveshaft to the propulsor via the one of the forwardly rotating gear and reversely rotating gear.

14. The method according to claim 12, wherein the rotating gear comprises one of a reversely rotating gear for reverse propulsion and a forwardly rotating gear for forward propulsion and wherein the shift comprises disconnection of the driveshaft from the propulsor via one of the reversely rotating gear and forwardly rotating gear and connection of the driveshaft to the propulsor via the other of the reversely rotating gears and forwardly rotating gears.

15. The method according to claim 12, comprising monitoring a rotational speed of the rotating gear and then comparing a monitored rotational speed of the rotating gear to a threshold, and further comprising controlling the speed of the electric motor to decrease the speed of rotation of the driveshaft based on how the monitored rotational speed of the rotating gear compares to the threshold.

16. The method according to claim 12, comprising controlling the speed of the electric motor to increase the speed of rotation of the driveshaft after the shift change.

17. The method according to claim 16, comprising monitoring a rotational speed of the rotating gear and then comparing the monitored rotational speed of the rotating gear to a threshold, and further comprising controlling the speed of the electric motor to increase the speed of rotation of the driveshaft based on how the monitored rotational speed of the rotating gear compares to the threshold.

18. The method according claim 17, comprising controlling the clutch to couple the internal combustion engine to the driveshaft to rotate the driveshaft after the shift change.

19. The method according to claim 18, comprising controlling the of the electric motor to synchronize the monitored rotational speed of the rotating gear with a speed of the internal combustion engine before controlling the clutch to connect the internal combustion engine to the driveshaft to rotate the driveshaft.

20. The method according to claim 11, comprising generating electricity with the electric motor to charge at least one battery as the electric motor decreases the speed of rotation of the driveshaft.

\* \* \* \* \*